(12) United States Patent
Yea et al.

(10) Patent No.: US 11,657,542 B2
(45) Date of Patent: May 23, 2023

(54) TECHNIQUES AND APPARATUS FOR ALPHABET-PARTITION CODING OF TRANSFORM COEFFICIENTS FOR POINT CLOUD COMPRESSION

(71) Applicant: TENCENT AMERICA LLC, Palo Alto, CA (US)

(72) Inventors: Sehoon Yea, Palo Alto, CA (US); Stephan Wenger, Palo Alto, CA (US); Shan Liu, Palo Alto, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 18/071,315

(22) Filed: Nov. 29, 2022

(65) Prior Publication Data
US 2023/0090878 A1    Mar. 23, 2023

Related U.S. Application Data

(63) Continuation of application No. 17/585,826, filed on Jan. 27, 2022, now Pat. No. 11,544,819, which is a
(Continued)

(51) Int. Cl.
*G06T 3/40* (2006.01)
*G06T 9/40* (2006.01)
(Continued)

(52) U.S. Cl.
CPC ........ *G06T 3/4084* (2013.01); *G06F 18/2163* (2023.01); *G06T 9/40* (2013.01); *G06T 17/00* (2013.01); *G06T 2210/56* (2013.01)

(58) Field of Classification Search
None
See application file for complete search history.

(56) References Cited

U.S. PATENT DOCUMENTS

| | | | |
|---|---|---|---|
| 10,587,286 B1 * | 3/2020 | Flynn | ...................... H03M 7/40 |
| 10,681,388 B2 * | 6/2020 | Covell | ................... H04N 19/13 |

(Continued)

FOREIGN PATENT DOCUMENTS

WO    2007/021616 A2    2/2007

OTHER PUBLICATIONS

3DG, "G-PCC codec description v1", International Organisation for Standardisation; ISE/IEC JTC1/SC29/WG11 Coding of Moving Pictures and Audio, N18015, Oct. 2018, Macau, China (31 pages total).

(Continued)

*Primary Examiner* — Anand P Bhatnagar
(74) *Attorney, Agent, or Firm* — Sughrue Mion, PLLC

(57) ABSTRACT

A method, apparatus, and computer-readable medium for point cloud coefficient coding are provided. Transform coefficients associated with point cloud data are decomposed into set-index values and symbol-index values, the symbol index-value specifying location of the transform coefficient within a set. The decomposed transform coefficients are partitioned into one or more sets based on the set-index values and the symbol-index values. The set-index values of the partitioned transform coefficients are entropy-coded, and the symbol-index values of the partitioned transform coefficients are bypass-coded. The point cloud data is compressed based on the entropy-coded symbol-index values and the bypass-coded set-index values.

20 Claims, 9 Drawing Sheets

Related U.S. Application Data continuation of application No. 17/110,691, filed on Dec. 3, 2020, now Pat. No. 11,373,276.

(60) Provisional application No. 62/958,846, filed on Jan. 9, 2020, provisional application No. 62/958,839, filed on Jan. 9, 2020.

(51) Int. Cl.
*G06T 17/00* (2006.01)
*G06F 18/21* (2023.01)

(56) References Cited

U.S. PATENT DOCUMENTS

| | | | | |
|---|---|---|---|---|
| 10,861,196 | B2* | 12/2020 | Mammou | G06T 3/4007 |
| 10,897,269 | B2* | 1/2021 | Mammou | H03M 7/30 |
| 10,924,751 | B2* | 2/2021 | Choi | H04N 19/159 |
| 11,010,928 | B2* | 5/2021 | Mammou | G06T 9/00 |
| 2016/0086353 | A1 | 3/2016 | Lukac et al. | |
| 2017/0347122 | A1 | 11/2017 | Chou et al. | |
| 2019/0080483 | A1* | 3/2019 | Mammou | H04N 19/593 |
| 2019/0081638 | A1 | 3/2019 | Mammou et al. | |
| 2019/0200046 | A1* | 6/2019 | Lucas | H04N 19/124 |
| 2020/0013215 | A1 | 1/2020 | Vosoughi et al. | |
| 2020/0304813 | A1* | 9/2020 | Choi | H04N 19/159 |
| 2020/0394822 | A1* | 12/2020 | Gao | G06T 9/001 |
| 2021/0049790 | A1* | 2/2021 | Gao | G06T 9/00 |
| 2021/0103780 | A1* | 4/2021 | Mammou | G06T 11/20 |
| 2021/0105022 | A1* | 4/2021 | Flynn | H03M 7/6011 |

OTHER PUBLICATIONS

Extended European Search Report dated Mar. 16, 2022 in European Application No. 21738085.6.
Sehoon Yea et al., "[G-PCC] Alphabet-partition coding of transform coefficients", International Organisation for Standardisation; ISO/IEC JTC1/SC29/WG11, Coding of Moving Pictures and Audio, MPEG2019/m52720, Jan. 2020, Brussels, BE (10 pages total).
Communication dated Aug. 22, 2022 from the Indian Patent Office in Indian Application No. 202147051268.
3DG, "G-PCC codec description v2", International Organisation for Standardisation, Organisation Internationale De Normalisation, ISO/IEC JTC1/SC29/WG11, Coding of Moving Pictures and Audio, ISO/IEC JTC1/SC29/WG11, N18189, Jan. 2019, Marrakech, MA (39 pages total).
International Search Report dated Mar. 18, 2021 in International Application No. PCT/US2021/012527.
Written Opinion of the International Searching Authority dated Mar. 18, 2021 in International Application No. PCT/US2021/012527.
Dan Chen et al., "Alphabet Partitioning Techniques for Semi-Adaptive Huffman Coding of Large Alphabets", Department of Computer and Information Science Polytechnic University, 2006, Retrieved from:URL: <https://citeseerx.ist.psu.edu/viewdoc/download?doi=10.1.1.61.8815&rep=rep1&type=pdf> (24 pages).

* cited by examiner

TECHNIQUES AND APPARATUS FOR ALPHABET-PARTITION CODING OF TRANSFORM COEFFICIENTS FOR POINT CLOUD COMPRESSION

CROSS-REFERENCE TO RELATED APPLICATION

This application is a Continuation Application of U.S. application Ser. No. 17/585,826 filed on Jan. 27, 2022, which is a Continuation Application of U.S. application Ser. No. 17/110,691, filed on Dec. 3, 2020, now U.S. Pat. No. 11,373,276 issued on Jun. 28, 2022, which claims priority from U.S. Provisional Patent Application Nos. 62/958,839 and 62/958,846, both filed Jan. 9, 2020, in the U.S. Patent and Trademark Office, disclosures of which are incorporated herein by reference in their entireties.

BACKGROUND

1. Field

Methods and apparatuses consistent with embodiments relate to graph-based point cloud compression (G-PCC), and more particularly, a method and an apparatus for point cloud coefficient coding.

2. Description of Related Art

Advanced three-dimensional (3D) representations of the world are enabling more immersive forms of interaction and communication, and also allow machines to understand, interpret and navigate our world. 3D point clouds have emerged as an enabling representation of such information. A number of use cases associated with point cloud data have been identified, and corresponding requirements for point cloud representation and compression have been developed. For example, points clouds can be used in autonomous driving for object detection and localization. Point clouds may also used in geographic information systems (GIS) for mapping, and used in cultural heritage to visualize and archive cultural heritage objects and collections A point cloud is a set of points in a 3D space, each with associated attributes, e.g., color, material properties, etc. Point clouds can be used to reconstruct an object or a scene as a composition of such points. They can be captured using multiple cameras, depth sensors or Lidar sensors in various settings, and may be made up of thousands up to billions of points in order to realistically represent reconstructed scenes.

Compression technologies are needed to reduce the amount of data to represent a point cloud. As such, technologies are needed for lossy compression of point clouds for use in real-time communications and six degrees of freedom (6DoF) virtual reality. In addition, technology is sought for lossless point cloud compression in the context of dynamic mapping for autonomous driving and cultural heritage applications, etc. The Moving Picture Experts Group (MPEG) has started working on a standard to address compression of geometry and attributes such as colors and reflectance, scalable/progressive coding, coding of sequences of point clouds captured over time, and random access to subsets of a point cloud.

FIG. 1A is a diagram illustrating a method of generating levels of detail (LoD) in G-PCC.

Referring to FIG. 1A, in current G-PCC attributes coding, an LoD (i.e., a group) of each 3D point (e.g., P0-P9) is generated based on a distance of each 3D point, and then attribute values of 3D points in each LoD is encoded by applying prediction in an LoD-based order 110 instead of an original order 105 of the 3D points. For example, an attributes value of the 3D point P2 is predicted by calculating a distance-based weighted average value of the 3D points P0, P5 and P4 that were encoded or decoded prior to the 3D point P2.

A current anchor method in G-PCC proceeds as follows.

First, a variability of a neighborhood of a 3D point is computed to check how different neighbor values are, and if the variability is lower than a threshold, the calculation of the distance-based weighted average prediction is conducted by predicting attribute values $(\alpha_i)_{i \in 0 \ldots k-1}$, using a linear interpolation process based on distances of nearest neighbors of a current point i. Let $\aleph_i$ be a set of k-nearest neighbors of the current point i, let $(\tilde{a}_j)_{j \in \aleph_i}$ be their decoded/reconstructed attribute values and let $(\delta_j)_{j \in \aleph_i}$ be their distances to the current point i. A predicted attribute value $\hat{\alpha}_i$ is then given by:

$$\hat{a}_i = \text{Round}\left(\frac{1}{k}\sum_{j \in \aleph_i} \frac{\frac{1}{\delta_j^2}}{\sum_{j \in \aleph_i} \frac{1}{\delta_j^2}} \tilde{a}_j\right). \quad \text{(Eq. 1)}$$

Note that geometric locations of all point clouds are already available when attributes are coded. In addition, the neighboring points together with their reconstructed attribute values are available both at an encoder and a decoder as a k-dimensional tree structure that is used to facilitate a nearest neighbor search for each point in an identical manner.

Second, if the variability is higher than the threshold, a rate-distortion optimized (RDO) predictor selection is performed. Multiple predictor candidates or candidate predicted values are created based on a result of a neighbor point search in generating LoD. For example, when the attributes value of the 3D point P2 is encoded by using prediction, a weighted average value of distances from the 3D point P2 to respectively the 3D points P0, P5 and P4 is set to a predictor index equal to 0. Then, a distance from the 3D point P2 to the nearest neighbor point P4 is set to a predictor index equal to 1. Moreover, distances from the 3D point P2 to respectively the next nearest neighbor points P5 and P0 are set to predictor indices equal to 2 and 3, as shown in Table 1 below.

TABLE 1

Sample of predictor candidate for attributes coding

| Predictor index | Predicted value |
|---|---|
| 0 | average |
| 1 | P4 ($1^{st}$ nearest point) |
| 2 | P5 ($2^{nd}$ nearest point) |
| 3 | P0 ($3^{rd}$ nearest point) |

After creating predictor candidates, a best predictor is selected by applying a rate-distortion optimization procedure, and then, a selected predictor index is mapped to a truncated unary (TU) code, bins of which will be arithmetically encoded. Note that a shorter TU code will be assigned to a smaller predictor index in Table 1.

A maximum number of predictor candidates MaxNumCand is defined and is encoded into an attributes header. In the current implementation, the maximum number of predictor candidates MaxNumCand is set to equal to numberOfNearestNeighborsInPrediction+1 and is used in encoding and decoding predictor indices with a truncated unary binarization.

A lifting transform for attribute coding in G-PCC builds on top of a predicting transform described above. A main difference between the prediction scheme and the lifting scheme is the introduction of an update operator.

FIG. 1B is a diagram of an architecture for P/U (Prediction/Update)-lifting in G-PCC. To facilitate prediction and update steps in lifting, one has to split a signal into two sets of high-correlation at each stage of decomposition. In the lifting scheme in G-PCC, the splitting is performed by leveraging an LoD structure in which such high-correlation is expected among levels and each level is constructed by a nearest neighbor search to organize non-uniform point clouds into a structured data. A P/U decomposition step at a level N results in a detail signal D(N−1) and an approximation signal A(N−1), which is further decomposed into D(N−2) and A(N−2). This step is repeatedly applied until a base layer approximation signal A(1) is obtained.

Consequently, instead of coding an input attribute signal itself that consists of LOD(N), . . . , LOD(1), one ends up coding D(N−1), D(N−2), . . . , D(1), A(1) in the lifting scheme. Note that application of efficient P/U steps often leads to sparse subbands "coefficients" in D(N−1), . . . , D(1), thereby providing a transform coding gain advantage.

Currently, a distance-based weighted average prediction described above for the predicting transform is used for a prediction step in the lifting as an anchor method in G-PCC.

In prediction and lifting for attribute coding in G-PCC, an availability of neighboring attribute samples is important for compression efficiency as more of the neighboring attribute samples can provide better prediction. In a case in which there are not enough neighbors to predict from, the compression efficiency can be compromised.

Another type of transform for attribute coding in G-PCC may be Region Adaptive Hierarchical Transform (RAHT). RAHT and its inverse may be performed with respect to a hierarchy defined by Morton codes of voxel locations. The Morton code of d-bit non-negative integer coordinates x, y, and z may be a 3d-bit non-negative integer that may be obtained by interleaving the bits of x, y, and z. The Morton code M=morton(x,y,z) of non-negative d-bit integers coordinates $$x = \sum_{\ell=1}^{d} 2^{d-\ell} x_\ell, \ y = \sum_{\ell=1}^{d} 2^{d-\ell} y_\ell, \ z = \sum_{\ell=1}^{d} 2^{d-\ell} z_\ell, \qquad \text{(Eq. 2)}$$

where $x_\ell, y_\ell, z_\ell \in \{0,1\}$ may be the bits of x, y, and z from $\ell=1$ (high order) to $\ell=d$ (low order), is the non-negative 3d-bit integer $$M = \sum_{\ell=1}^{d} 2^{3(d-\ell)} (4x_\ell + 2y_\ell + z_\ell) = \sum_{\ell'=1}^{3d} 2^{3d-\ell'} m_{\ell'}, \qquad \text{(Eq. 3)}$$

where $m_{\ell'} \in \{0,1\}$ may be the bits of M from $\ell'=1$ (high order) to $\ell'=3d$ (low order).

$prefix_{\ell'}(M) = \lfloor 2^{-(3d-\ell')} M \rfloor$ may denote the $\ell'$-bit prefix of M. m may be such a prefix. The block at level $\ell'$ may be defined with prefix m to be the set of all points (x,y,z) for which $m = prefix_{\ell'}(morton(x,y,z))$. Two blocks at level $\ell'$ may be sibling blocks if they have the same $(\ell'-1)$-bit prefix. The union of two sibling blocks at level $\ell'$ may be a block at level ($\ell'-1$) called their parent block.

The Region Adaptive Haar Transform of the sequence $A_n$, n=1, . . . , N, and its inverse, may include a base case and a recursive function. For the base case, $A_n$ may be the attribute of a point and $T_n$ may be its transform, where $T_n=A_n$. For the recursive function, there may be two sibling blocks and their parent block. $(A_{01}, A_{02}, \ldots, A_{0w_0})$ and $(A_{11}, A_{12}, \ldots, A_{1w_1})$ may be the attributes of the points $(x_n, y_n, z_n)$ in the sibling blocks listed in increasing Morton order, and $(T_{01}, T_{02}, \ldots, T_{0w_0})$ and $(T_{11}, T_{12}, \ldots, T_{1w_1})$ may be their respective transforms. Similarly, $(A_1, A_2, \ldots, A_{w_0+w_1})$ may be the attributes of all points $(x_n, y_n, z_n)$ in their parent block listed in increasing Morton order, and $(T_1, T_2, \ldots, T_{w_0+w_1})$ may be its transform. Then, $$(T_1, T_2, \ldots, T_{w_0}, T_{w_0+1}, T_{w_0+2}, \ldots, T_{w_0+w_1}) = \\ (aT_{01}+bT_{11}, T_{02}, \ldots, T_{0w_0}, -bT_{01}+aT_{11}, T_{12}, \ldots, T_{1w_1}), \qquad \text{(Eq. 4)}$$

$$(T_{01}, T_{02}, \ldots, T_{0w_0}) = (aT_1 - bT_{w_0+1}, T_2, \ldots, T_{w_0}), \qquad \text{(Eq. 5)}$$

and $$(T_{11}, T_{12}, \ldots, T_{1w_1}) = (bT_1 + aT_{w_0+1}, T_{w_0+2}, \ldots, T_{w_0+w_1}), \qquad \text{(Eq. 6)}$$

where $$a = \sqrt{\frac{w_0}{w_0 + w_1}} \text{ and } b = \sqrt{\frac{w_1}{w_0 + w_1}}. \qquad \text{(Eq. 7)}$$

The transform of the parent block may be the concatenation of the two sibling blocks, with the exception that the first (DC) components of the transforms of the two sibling blocks may replaced by their weighted sum and difference, and inversely the transforms of the two sibling blocks may be copied from the first and last parts of the transform of the parent block, with the exception that the DC components of the transforms of the two sibling blocks may be replaced by their weighted difference and sum $$\begin{bmatrix} T_1 \\ T_{w_0+1} \end{bmatrix} = \begin{bmatrix} a & b \\ -b & a \end{bmatrix} \begin{bmatrix} T_{01} \\ T_{11} \end{bmatrix} \qquad \text{(Eq. 8)}$$

and $$\begin{bmatrix} T_{01} \\ T_{11} \end{bmatrix} = \begin{bmatrix} a & -b \\ b & a \end{bmatrix} \begin{bmatrix} T_1 \\ T_{w_0+1} \end{bmatrix}. \qquad \text{(Eq. 9)}$$

In order to efficiently code the transformed attribute coefficients, an adaptive look up table (A-LUT) that may keep track of the N (e.g., 32) most frequent coefficient symbols and a cache that may keep track of the last different observed M (e.g., 16) coefficient symbols may be used. The A-LUT may be initialized with N symbols provided by the user or computed offline based on the statistics of a similar class of point clouds. The cache may be initialized with M symbols provided by the user or computed offline based on the statistics of a similar class of point clouds. When a symbol S is encoded, a binary information indicating whether or not S is the A-LUT may be encoded. If S is in the A-LUT, the index of S in the A-LUT may be encoded by using a binary arithmetic encoder. The number of occurrences of the symbol S in A-LUT may be incremented by one. If S is not the A-LUT, a binary information indicating whether or not S is in the cache may be encoded. If S is in the cache, then the binary representation of its index may be encoded by using a binary arithmetic encoder. If S is not in the cache, then the binary representation of S may be encoded by using a binary arithmetic encoder. The symbol S may be added to the cache and the oldest symbol in the cache is evicted

SUMMARY

According to embodiments, a method of point cloud coefficient coding is performed by at least one processor and includes decomposing transform coefficients associated with point cloud data into set-index values and symbol-index values, the symbol index-value specifying location of the transform coefficient in a set. The decomposed transform coefficients may be partitioned into one or more sets based on the set-index values and the symbol-index values. The set-index values of the partitioned transform coefficients may be entropy-coded, and the symbol-index values of the partitioned transform coefficients may be bypass-coded. The point cloud data may be compressed based on the entropy-coded set-index values and the bypass-coded symbol-index values.

According to embodiments, an apparatus for point cloud coefficient coding includes at least one memory configured to store computer program code, and at least one processor configured to access the at least one memory and operate according to the computer program code. The computer program code includes code configured to cause the at least one processor to carry out a method that may include decomposing transform coefficients associated with point cloud data into set-index values and symbol-index values, the symbol index-value specifying location of the transform coefficient within a set. The decomposed transform coefficients may be partitioned into one or more sets based on the set-index values and the symbol-index values. The set-index values of the partitioned transform coefficients may be entropy-coded, and the symbol-index values of the partitioned transform coefficients may be bypass-coded. The point cloud data may be compressed based on the entropy-coded set-index values and the bypass-coded symbol-index values.

According to embodiments, a non-transitory computer-readable storage medium stores instructions that cause at least one processor to decompose transform coefficients associated with point cloud data into set-index values and symbol-index values, the symbol index-value specifying location of the transform coefficient within a set. The decomposed transform coefficients may be partitioned into one or more sets based on the set-index values and the symbol-index values. The set-index values of the partitioned transform coefficients may be entropy-coded, and the symbol-index values of the partitioned transform coefficients may be bypass-coded. The point cloud data may be compressed based on the entropy-coded set-index values and the bypass-coded symbol-index values.

DETAILED DESCRIPTION

Embodiments described herein provide a method and an apparatus for point cloud coefficient coding. In detail, the coding of transform coefficients from Lifting, Predicting-Transform, and RAHT may be performed by frequency-sorted look-up table index coding, cache-index coding, and direct coding of the symbol value. In practice, these may require multiple lookup tables and caches with many (typically 32 to possibly up to 256) entries to cover one-byte codewords. These look-up-tables and caches may additionally need regular updates, the frequency of which may imply different tradeoffs in terms of computational requirement and coding efficiency. It may be advantageous, therefore, to improve the coding of transform coefficients for attributes in G-PCC in terms of complexity/memory and compression efficiency trade-offs through alphabet-partitioning and coding of the alphabet-partition information.

Figure 2:
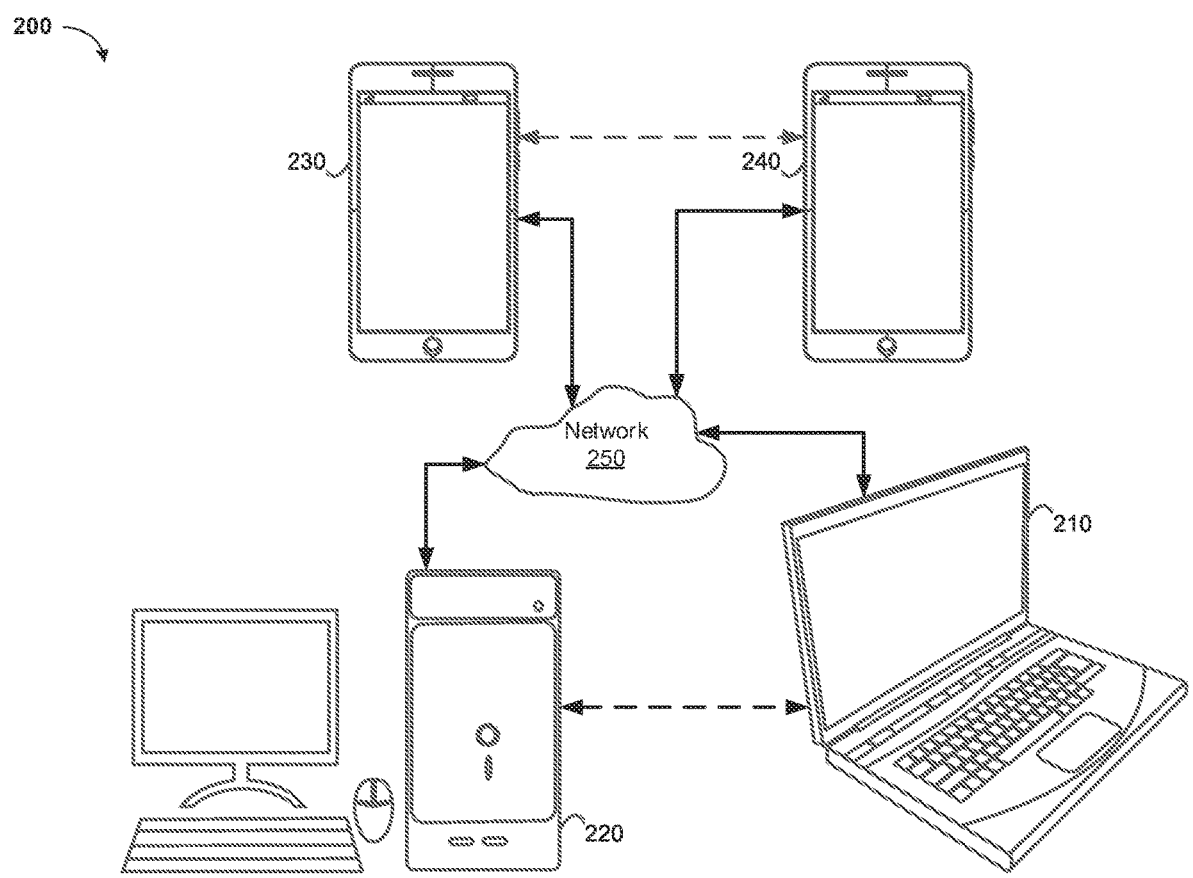
FIG. 2 is a block diagram of a communication system according to embodiments.

FIG. 2 is a block diagram of a communication system 200 according to embodiments. The communication system 200 may include at least two terminals 210 and 220 interconnected via a network 250. For unidirectional transmission of data, a first terminal 210 may code point cloud data at a local location for transmission to a second terminal 220 via the network 250. The second terminal 220 may receive the coded point cloud data of the first terminal 210 from the network 250, decode the coded point cloud data and display the decoded point cloud data. Unidirectional data transmission may be common in media serving applications and the like.

FIG. 2 further illustrates a second pair of terminals 230 and 240 provided to support bidirectional transmission of coded point cloud data that may occur, for example, during videoconferencing. For bidirectional transmission of data, each terminal 230 or 240 may code point cloud data captured at a local location for transmission to the other terminal via the network 250. Each terminal 230 or 240 also may receive the coded point cloud data transmitted by the other terminal, may decode the coded point cloud data and may display the decoded point cloud data at a local display device.

In FIG. 2, the terminals 210-240 may be illustrated as servers, personal computers and smartphones, but principles of the embodiments are not so limited. The embodiments find application with laptop computers, tablet computers, media players and/or dedicated video conferencing equipment. The network 250 represents any number of networks that convey coded point cloud data among the terminals 210-240, including for example wireline and/or wireless communication networks. The communication network 250 may exchange data in circuit-switched and/or packet-switched channels. Representative networks include telecommunications networks, local area networks, wide area networks and/or the Internet. For the purposes of the present discussion, an architecture and topology of the network 250 may be immaterial to an operation of the embodiments unless explained herein below.

Figure 3:
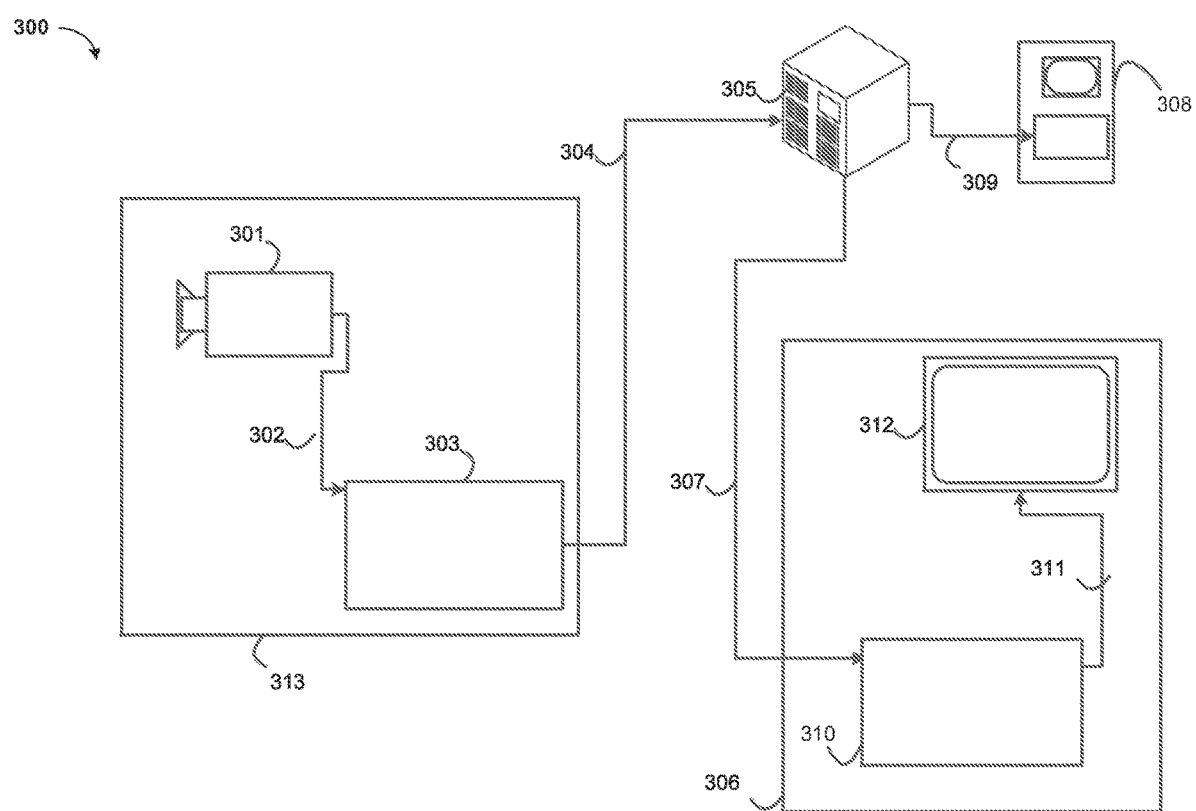
FIG. 3 is a diagram of a placement of a G-PCC compressor and a G-PCC decompressor in an environment, according to embodiments.

FIG. 3 is a diagram of a placement of a G-PCC compressor 303 and a G-PCC decompressor 310 in an environment, according to embodiments. The disclosed subject matter can be equally applicable to other point cloud enabled applications, including, for example, video conferencing, digital TV, storing of compressed point cloud data on digital media including CD, DVD, memory stick and the like, and so on.

A streaming system 300 may include a capture subsystem 313 that can include a point cloud source 301, for example a digital camera, creating, for example, uncompressed point cloud data 302. The point cloud data 302 having a higher data volume can be processed by the G-PCC compressor 303 coupled to the point cloud source 301. The G-PCC compressor 303 can include hardware, software, or a combination thereof to enable or implement aspects of the disclosed subject matter as described in more detail below. Encoded point cloud data 304 having a lower data volume can be stored on a streaming server 305 for future use. One or more streaming clients 306 and 308 can access the streaming server 305 to retrieve copies 307 and 309 of the encoded point cloud data 304. A client 306 can include the G-PCC decompressor 310, which decodes an incoming copy 307 of the encoded point cloud data and creates outgoing point cloud data 311 that can be rendered on a display 312 or other rendering devices (not depicted). In some streaming systems, the encoded point cloud data 304, 307 and 309 can be encoded according to video coding/compression standards. Examples of those standards include those being developed by MPEG for G-PCC.

Figure 4:
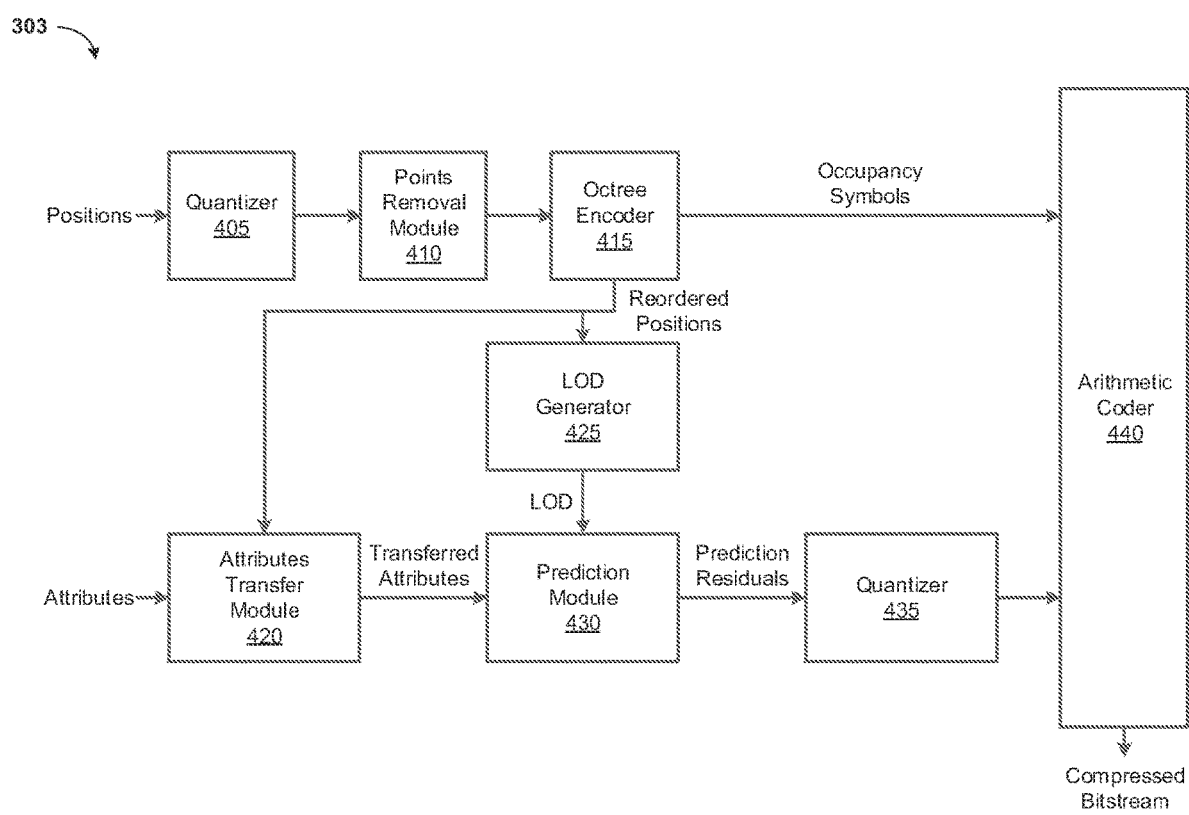
FIG. 4 is a functional block diagram of the G-PCC compressor according to embodiments.

FIG. 4 is a functional block diagram of a G-PCC compressor 303 according to embodiments.

As shown in FIG. 4, the G-PCC compressor 303 includes a quantizer 405, a points removal module 410, an octree encoder 415, an attributes transfer module 420, an LoD generator 425, a prediction module 430, a quantizer 435 and an arithmetic coder 440.

The quantizer 405 receives positions of points in an input point cloud. The positions may be (x,y,z)-coordinates. The quantizer 405 further quantizes the received positions, using, e.g., a scaling algorithm and/or a shifting algorithm.

The points removal module 410 receives the quantized positions from the quantizer 405, and removes or filters duplicate positions from the received quantized positions.

The octree encoder 415 receives the filtered positions from the points removal module 410, and encodes the received filtered positions into occupancy symbols of an octree representing the input point cloud, using an octree encoding algorithm. A bounding box of the input point cloud corresponding to the octree may be any 3D shape, e.g., a cube.

The octree encoder 415 further reorders the received filtered positions, based on the encoding of the filtered positions.

The attributes transfer module 420 receives attributes of points in the input point cloud. The attributes may include, e.g., a color or RGB value and/or a reflectance of each point. The attributes transfer module 420 further receives the reordered positions from the octree encoder 415.

The attributes transfer module 420 further updates the received attributes, based on the received reordered positions. For example, the attributes transfer module 420 may perform one or more among pre-processing algorithms on the received attributes, the pre-processing algorithms including, for example, weighting and averaging the received attributes and interpolation of additional attributes from the received attributes. The attributes transfer module 420 further transfers the updated attributes to the prediction module 430.

The LoD generator 425 receives the reordered positions from the octree encoder 415, and obtains an LoD of each of the points corresponding to the received reordered positions. Each LoD may be considered to be a group of the points, and may be obtained based on a distance of each of the points. For example, as shown in FIG. 1A, points P0, P5, P4 and P2 may be in an LoD LOD0, points P0, P5, P4, P2, P1, P6 and P3 may be in an LoD LOD1, and points P0, P5, P4, P2, P1, P6, P3, P9, P8 and P7 may be in an LoD LOD2.

The prediction module 430 receives the transferred attributes from the attributes transfer module 420, and receives the obtained LoD of each of the points from the LoD generator 425. The prediction module 430 obtains prediction residuals (values) respectively of the received attributes by applying a prediction algorithm to the received attributes in an order based on the received LoD of each of the points. The prediction algorithm may include any among various prediction algorithms such as, e.g., interpolation, weighted average calculation, a nearest neighbor algorithm and RDO.

Figure 1A:
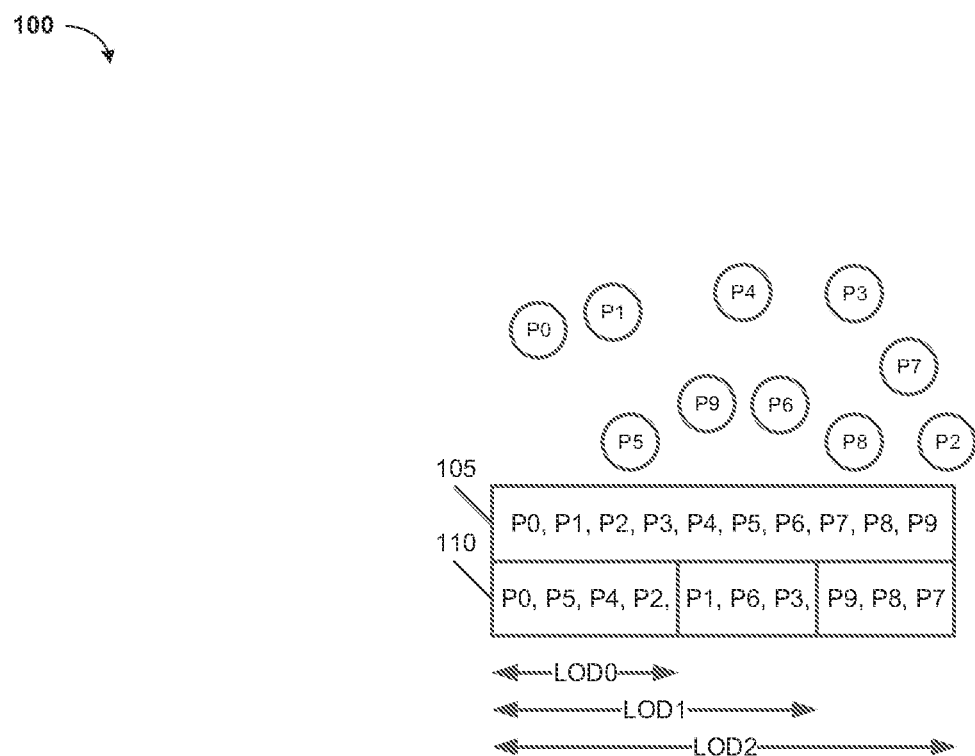
FIG. 1A is a diagram illustrating a method of generating LoD in G-PCC.
Figure 1B:
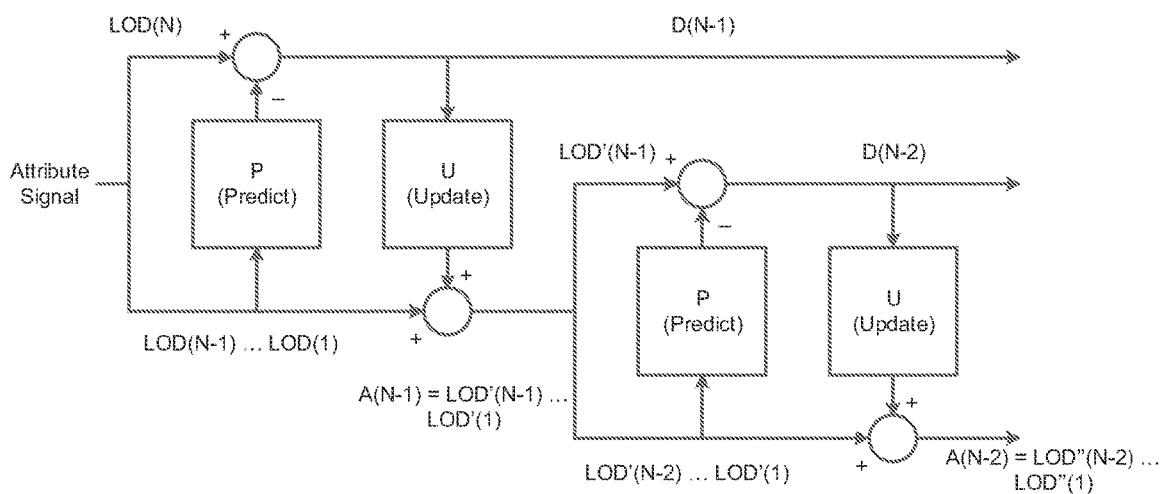
FIG. 1B is a diagram of an architecture for P/U-lifting in G-PCC.

For example, as shown in FIG. 1A, the prediction residuals respectively of the received attributes of the points P0, P5, P4 and P2 included in the LoD LOD0 may be obtained first prior to those of the received attributes of the points P1, P6, P3, P9, P8 and P7 included respectively in the LoDs LOD1 and LOD2. The prediction residuals of the received attributes of the point P2 may be obtained by calculating a distance based on a weighted average of the points P0, P5 and P4.

The quantizer 435 receives the obtained prediction residuals from the prediction module 430, and quantizes the received predicted residuals, using, e.g., a scaling algorithm and/or a shifting algorithm.

The arithmetic coder 440 receives the occupancy symbols from the octree encoder 415, and receives the quantized prediction residuals from the quantizer 435. The arithmetic coder 440 performs arithmetic coding on the received occupancy symbols and quantized predictions residuals to obtain a compressed bitstream. The arithmetic coding may include any among various entropy encoding algorithms such as, e.g., context-adaptive binary arithmetic coding.

Figure 5:
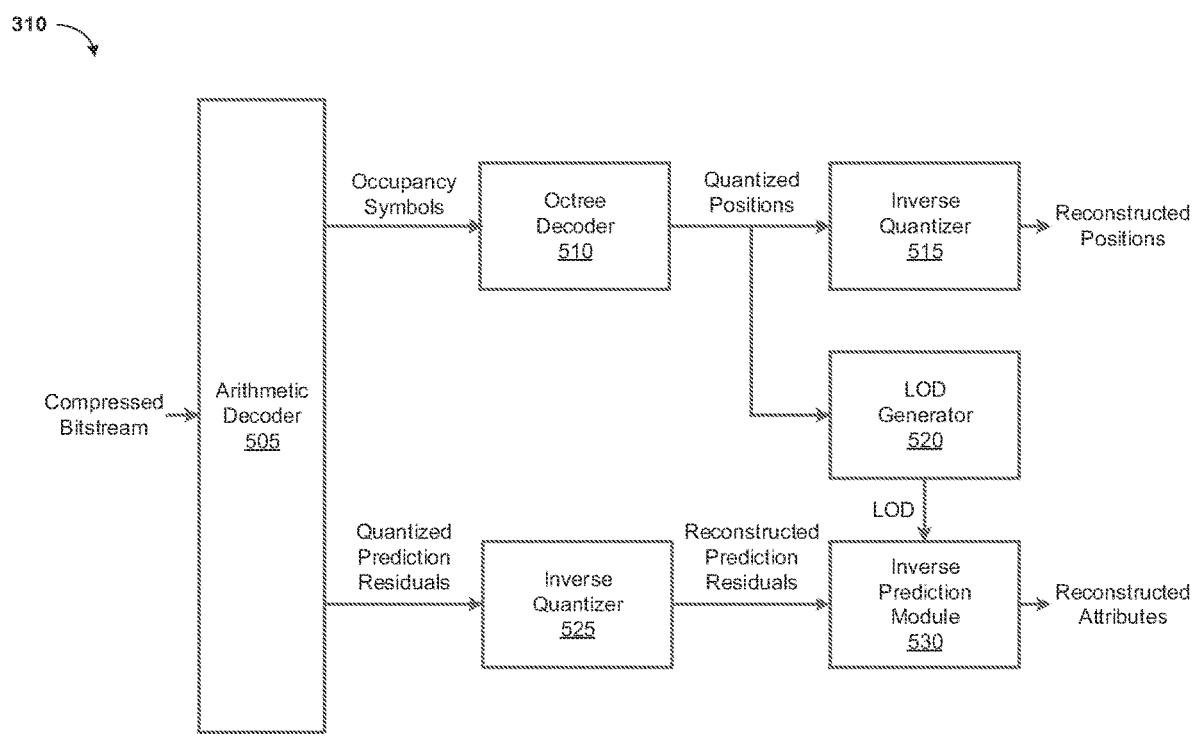
FIG. 5 is a functional block diagram of the G-PCC decompressor according to embodiments.

FIG. 5 is a functional block diagram of a G-PCC decompressor 310 according to embodiments.

As shown in FIG. 5, the G-PCC decompressor 310 includes an arithmetic decoder 505, an octree decoder 510, an inverse quantizer 515, an LoD generator 520, an inverse quantizer 525 and an inverse prediction module 530.

The arithmetic decoder 505 receives the compressed bitstream from the G-PCC compressor 303, and performs arithmetic decoding on the received compressed bitstream to obtain the occupancy symbols and the quantized prediction residuals. The arithmetic decoding may include any among various entropy decoding algorithms such as, e.g., context-adaptive binary arithmetic decoding.

The octree decoder 510 receives the obtained occupancy symbols from the arithmetic decoder 505, and decodes the received occupancy symbols into the quantized positions, using an octree decoding algorithm.

The inverse quantizer 515 receives the quantized positions from the octree decoder 510, and inverse quantizes the received quantized positions, using, e.g., a scaling algorithm and/or a shifting algorithm, to obtain reconstructed positions of the points in the input point cloud.

The LoD generator 520 receives the quantized positions from the octree decoder 510, and obtains the LoD of each of the points corresponding to the received quantized positions.

The inverse quantizer 525 receives the obtained quantized prediction residuals, and inverse quantizes the received quantized prediction residuals, using, e.g., a scaling algorithm and/or a shifting algorithm, to obtain reconstructed prediction residuals.

The inverse prediction module 530 receives the obtained reconstructed prediction residuals from the inverse quantizer 525, and receives the obtained LoD of each of the points from the LoD generator 520. The inverse prediction module 530 obtains reconstructed attributes respectively of the received reconstructed prediction residuals by applying a prediction algorithm to the received reconstructed prediction residuals in an order based on the received LoD of each of the points. The prediction algorithm may include any among various prediction algorithms such as, e.g., interpolation, weighted average calculation, a nearest neighbor algorithm and RDO. The reconstructed attributes are of the points in the input point cloud.

The method and the apparatus for point cloud coefficient coding will now be described in detail. Such a method and an apparatus may be implemented in the G-PCC compressor 303 described above, namely, the prediction module 430. The method and the apparatus may also be implemented in the G-PCC decompressor 310, namely, the inverse prediction module 530.

Alphabet-Partitioning of Transform Coefficients

Transformed coefficients or their 8-bit portions may be encoded either by using lookup tables (e.g., the A-LUT described above) or a bypass-coding with 256 symbols. The 8-bit coefficient value may be decomposed into a set-index and the symbol-index inside the set which may specify the exact location of the coefficient value in the set. For example, the index values may correspond to locations within the lookup tables or within a cache. The 256 possible coefficient values may be grouped into N sets as described in Table 2 below.

TABLE 2

Example of alphabet-partitioning of coefficient values

| set-index | coefficient-value interval | symbol-index bit length |
|---|---|---|
| 0 | [1] | 0 |
| 1 | [2] | 0 |
| 2 | [3] | 0 |
| 3 | [4, 5] | 1 |
| 4 | [6, 7] | 1 |
| 5 | [8, 11] | 2 |
| . | . | . |
| . | . | . |
| . | . | . |
| N − 1 | [240, 255] | 4 |

In one or more embodiments, an offline training may be conducted to design a partitioning of the coefficient values given the number of partitions (N). The alphabet-partition boundary values may be signaled explicitly. Alternatively, an index may be signaled to indicate a specific alphabet-partition with associated boundary values given multiple alphabet-partition types shared between the encoder and the decoder. It may be appreciated that the partition may be designed so that more frequent symbols belong to sets with lower indices and smaller sizes, and vice versa, to improve coding efficiency.

In one or more embodiments, a cache or frequency-sorting based LUT may be used to keep track of the frequencies of coefficient-values in the descending order. In forming the alphabet-partition, lower set-indices may be assigned to the more frequent coefficient values by using the indices in the said cache or LUT instead of the coefficient values themselves, and vice versa. This process may be performed on the fly both at the encoder and the decoder.

Coding of Alphabet-Partition Information

The derived set-indices may be entropy-coded in various ways while the accompanying symbol-indices may simply be bypass-coded when the symbol distribution inside a set may be expected to be reasonably uniform.

In one or more embodiments, the derived set-indices are coded by multi-symbol arithmetic coding or other types of context-based binary arithmetic coding. Different alphabet-partitioning may be used in order to better leverage different characteristics of coefficients.

In one or more embodiments, different alphabet-partitioning can be used for different level-of-detail (LOD) layers of lifting/predict coefficients as higher LOD layers may have smaller coefficients as a result of lifting/predict decomposition.

In one or more embodiments, different alphabet-partitioning may be used for different quantization parameters (QPs) as higher QPs tend to result in smaller quantized coefficients and vice versa.

In one or more embodiments, different alphabet-partitioning may be used for different layers of granular scalability for SNR-scalable coding as enhancement layers (i.e., layers added to refine the reconstructed signal to a smaller QP level) may be of noisier or random nature in terms of correlation among coefficients.

In one or more embodiments, different alphabet-partitioning may be used depending upon the values of or a function of values of the reconstructed samples from corresponding locations in the lower quantization-level layers in the case of SNR-scalable coding. For example, it may be likely that areas with zero or very small reconstructed values in the lower layers may have different coefficient characteristics from areas with the opposite tendency.

In one or more embodiments, different alphabet-partitioning may be used depending upon the values of or a function of values of the reconstructed samples from corresponding locations in the lower LODs at the same quantization level. These samples from corresponding locations may be available as a result of the nearest-neighborhood search in LOD building in GPCC. It may be appreciated that these samples may be available at the decoder as well as a result of LOD-by-LOD reconstruction in the transform techniques in G-PCC.

Figure 6:
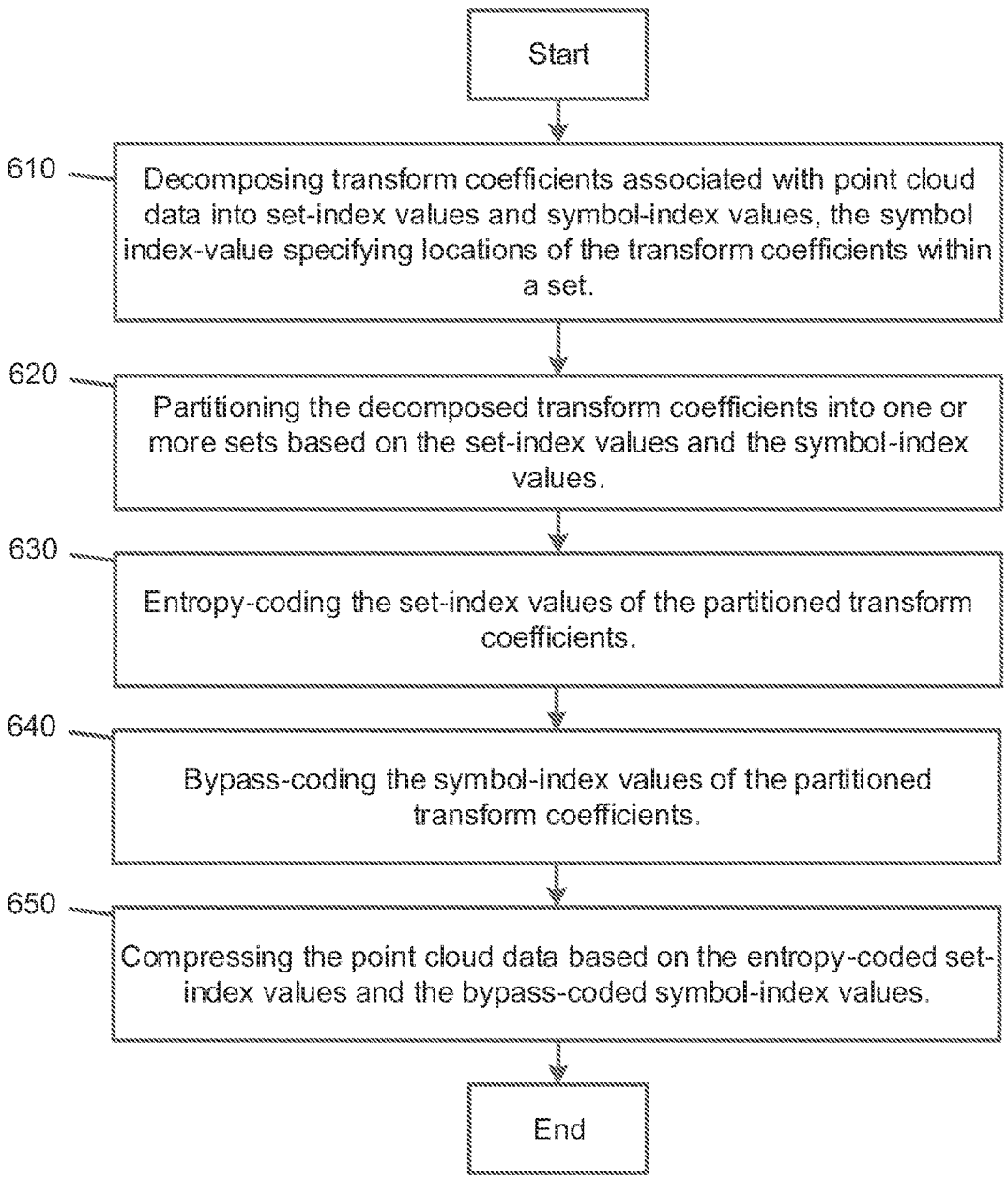
FIG. 6 is a flowchart illustrating a method of point cloud coefficient coding, according to embodiments.

FIG. 6 is a flowchart illustrating a method 600 of point cloud coefficient coding, according to embodiments. In some implementations, one or more process blocks of FIG. 6 may be performed by the G-PCC decompressor 310. In some implementations, one or more process blocks of FIG. 6 may be performed by another device or a group of devices separate from or including the G-PCC decompressor 310, such as the G-PCC compressor 303.

Referring to FIG. 6, in a first block 610, the method 600 includes decomposing transform coefficients associated with point cloud data into set-index values and symbol-index values, the symbol index-value specifying locations of the transform coefficients within a set.

In a second block 620, the method 600 includes partitioning the decomposed transform coefficients into one or more sets based on the set-index values and the symbol-index values.

In a third block 630, the method 600 includes entropy-coding the set-index values of the partitioned transform coefficients.

In a fourth block 640, the method 600 includes bypass-coding the symbol-index values of the partitioned transform coefficients.

In a fifth block 650, the method 600 includes compressing the point cloud data based on the entropy-coded set-index values and the bypass-coded symbol-index values.

Although FIG. 6 shows example blocks of the method 600, in some implementations, the method 600 may include additional blocks, fewer blocks, different blocks, or differently arranged blocks than those depicted in FIG. 6. Additionally, or alternatively, two or more of the blocks of the method 600 may be performed in parallel.

Further, the proposed methods may be implemented by processing circuitry (e.g., one or more processors or one or more integrated circuits). In an example, the one or more processors execute a program that is stored in a non-transitory computer-readable medium to perform one or more of the proposed methods.

Figure 7:
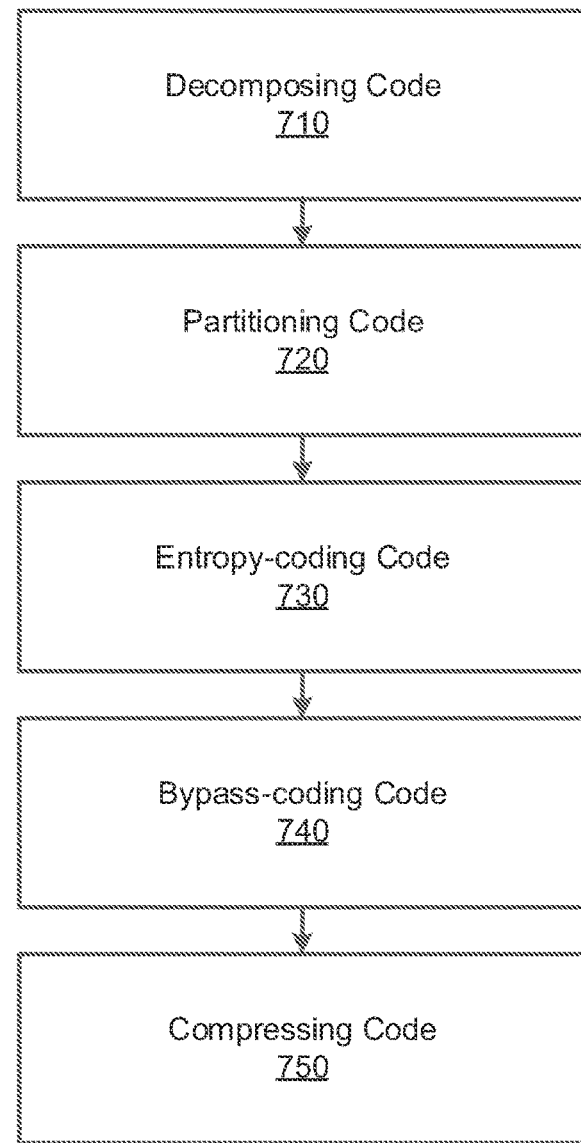
FIG. 7 is a block diagram of an apparatus for point cloud coefficient coding, according to embodiments.

FIG. 7 is a block diagram of an apparatus 700 for point cloud coefficient coding, according to embodiments.

Referring to FIG. 7, the apparatus 700 includes decomposing code 710, partitioning code 720, entropy-coding code 730 and bypass-coding code 740.

The decomposing code 710 is configured to cause at the least one processor to decompose transform coefficients associated with point cloud data into set-index values and symbol-index values, the symbol index-value specifying locations of the transform coefficients within a set.

The partition code 720 is configured to cause the at least one processor to partition the decomposed transform coefficients into one or more sets based on the set-index values and the symbol-index values.

The entropy-coding code 730 is configured to cause the at least one processor to entropy-code the set-index values of the partitioned transform coefficients.

The bypass-coding code 740 is configured to cause the at least one processor to bypass-code the symbol-index values of the partitioned transform coefficients.

The compressing code 750 is configured to cause the at least one processor to compress the point cloud data based on the entropy-coded set-index values and the bypass-coded symbol-index values.

Figure 8:
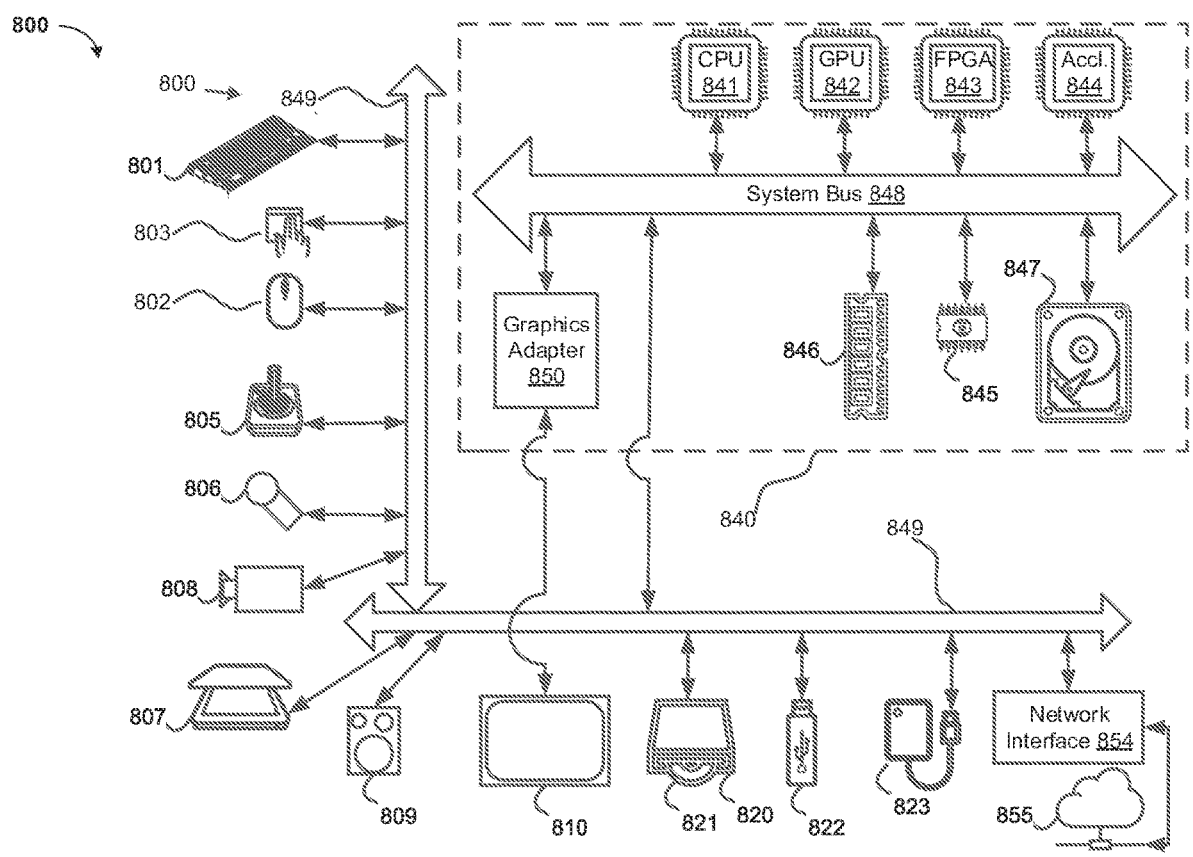
FIG. 8 is a diagram of a computer system suitable for implementing embodiments.

FIG. 8 is a diagram of a computer system 800 suitable for implementing embodiments.

Computer software can be coded using any suitable machine code or computer language, that may be subject to assembly, compilation, linking, or like mechanisms to create code including instructions that can be executed directly, or through interpretation, micro-code execution, and the like, by computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

The components shown in FIG. 8 for the computer system 800 are examples in nature and are not intended to suggest any limitation as to the scope of use or functionality of the computer software implementing the embodiments. Neither should the configuration of the components be interpreted as having any dependency or requirement relating to any one or combination of the components illustrated in the embodiments of the computer system 800.

The computer system 800 may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): a keyboard 801, a mouse 802, a trackpad 803, a touchscreen 810, a joystick 805, a microphone 806, a scanner 807, and a camera 808.

The computer system 800 may also include certain human interface output devices. Such human interface output devices may be stimulating the senses of one or more human users through, for example, tactile output, sound, light, and smell/taste. Such human interface output devices may include tactile output devices (for example tactile feedback by the touchscreen 810 or the joystick 805, but there can also be tactile feedback devices that do not serve as input devices), audio output devices (such as: speakers 809, headphones (not depicted)), visual output devices (such as screens 810 to include cathode ray tube (CRT) screens, liquid-crystal display (LCD) screens, plasma screens, organic light-emitting diode (OLED) screens, each with or without touchscreen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted). A graphics adapter 850 generates and outputs images to the touchscreen 810.

The computer system 800 can also include human accessible storage devices and their associated media such as optical media including a CD/DVD ROM/RW drive 820 with CD/DVD or the like media 821, a thumb drive 822, a removable hard drive or solid state drive 823, legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

The computer system 800 can also include interface(s) to one or more communication networks 855. The communication networks 855 can for example be wireless, wireline, optical. The networks 855 can further be local, wide-area, metropolitan, vehicular and industrial, real-time, delay-tolerant, and so on. Examples of the networks 855 include local area networks such as Ethernet, wireless LANs, cellular networks to include global systems for mobile communications (GSM), third generation (3G), fourth generation (4G), fifth generation (5G), Long-Term Evolution (LTE), and the like, TV wireline or wireless wide area digital networks to include cable TV, satellite TV, and terrestrial broadcast TV, vehicular and industrial to include CANBus, and so forth. The networks 855 commonly require external network interface adapters that attached to certain general purpose data ports or peripheral buses 849 (such as, for example universal serial bus (USB) ports of the computer system 800; others are commonly integrated into the core of the computer system 800 by attachment to a system bus as described below, for example, a network interface 854 including an Ethernet interface into a PC computer system and/or a cellular network interface into a smartphone computer system. Using any of these networks 855, the computer system 800 can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks 855 and network interfaces 854 as described above.

Aforementioned human interface devices, human-accessible storage devices, and network interfaces 854 can be attached to a core 840 of the computer system 800.

The core 840 can include one or more Central Processing Units (CPU) 841, Graphics Processing Units (GPU) 842, specialized programmable processing units in the form of Field Programmable Gate Areas (FPGA) 843, hardware accelerators 844 for certain tasks, and so forth. These devices, along with read-only memory (ROM) 845, random-access memory (RAM) 846, internal mass storage 847 such as internal non-user accessible hard drives, solid-state drives (SSDs), and the like, may be connected through a system bus 848. In some computer systems, the system bus 848 can be accessible in the form of one or more physical plugs to enable extensions by additional CPUs, GPU, and the like. The peripheral devices can be attached either directly to the core's system bus 848, or through the peripheral buses 849. Architectures for a peripheral bus include peripheral component interconnect (PCI), USB, and the like.

The CPUs 841, GPUs 842, FPGAs 843, and hardware accelerators 844 can execute certain instructions that, in combination, can make up the aforementioned computer code. That computer code can be stored in the ROM 845 or RAM 846. Transitional data can also be stored in the RAM 846, whereas permanent data can be stored for example, in the internal mass storage 847. Fast storage and retrieve to any of the memory devices can be enabled through the use of cache memory, that can be closely associated with the CPU 841, GPU 842, internal mass storage 847, ROM 845, RAM 846, and the like.

The computer readable media can have computer code thereon for performing various computer-implemented operations. The media and computer code can be those specially designed and constructed for the purposes of embodiments, or they can be of the kind well known and available to those having skill in the computer software arts.

As an example and not by way of limitation, the computer system 800 having architecture, and specifically the core 840 can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core 840 that are of non-transitory nature, such as the core-internal mass storage 847 or ROM 845. The software implementing various embodiments can be stored in such devices and executed by the core 840. A computer-readable medium can include one or more memory devices or chips, according to particular needs. The software can cause the core 840 and specifically the processors therein (including CPU, GPU, FPGA, and the like) to execute particular processes or particular parts of particular processes described herein, including defining data structures stored in the RAM 846 and modifying such data structures according to the processes defined by the software. In addition or as an alternative, the computer system can provide functionality as a result of logic hardwired or otherwise embodied in a circuit (for example: the hardware accelerator 844), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. Embodiments encompass any suitable combination of hardware and software.

While this disclosure has described several embodiments, there are alterations, permutations, and various substitute equivalents, which fall within the scope of the disclosure. It will thus be appreciated that those skilled in the art will be able to devise numerous systems and methods that, although not explicitly shown or described herein, embody the principles of the disclosure and are thus within the spirit and scope thereof.

What is claimed is:

1. A method of point cloud coefficient decoding, the method being performed by at least one processor, comprising:
   partitioning transform coefficients associated with compressed point cloud data into one or more sets;
   determining set-index values of the partitioned transform coefficients, wherein the determining comprises determining the set-index values from an aggregated super-symbol;
   determining symbol-index values of the partitioned transform coefficients; and
   generating decompressed point cloud data based on the set-index values and the symbol-index values.

2. The method of claim 1, wherein the partitioning of the transform coefficients comprises decomposing the transform coefficients associated with the compressed point cloud data to determine the set-index values and the symbol-index values, the symbol index-values specifying locations of the transform coefficients within a set.

3. The method of claim 1, wherein generating the aggregated super-symbol comprises:
   determining a maximum set-index value from the set-index values associated with children of a same patent node in an octree associated with point cloud data;
   entropy-coding the maximum set-index value based on the maximum set-index value being not zero; and
   aggregating a plurality of the set-index values together to entropy-code one or more groups of set-index values based on the maximum set-index value being small.

4. The method of claim 1, wherein generating the aggregated super-symbol comprises:
   determining a maximum set-index value from the set-index values associated with children of a same patent node in an octree associated with point cloud data;
   entropy-coding the maximum set-index value based on the maximum set-index value being not zero;
   entropy-coding an alpha value with a 255-symbol alphabet; and
   aggregating a plurality of the set-index values together to entropy-code one or more groups of set-index values based on a sibling occupancy value index of the octree being smaller than the maximum set-index value.

5. The method of claim 1, wherein frequency values associated with the transform coefficients are stored in a cache or frequency-sorting based lookup table in a descending order, wherein a lowest set-index value is assigned to a transform coefficient having a greatest frequency value.

6. The method of claim 1, wherein the symbol-index values and the set-index values are signaled to indicate an alphabet-partition having associated boundary values based on one or more alphabet-partition types shared between an encoder and a decoder.

7. The method of claim 6, wherein the one or more alphabet-partition types are used for one or more level-of-detail layers corresponding to the transform coefficients.

8. The method of claim 6, wherein the one or more alphabet-partition types are used for one or more inverse quantization parameters based on quantization of the transform coefficients.

9. The method of claim 6, wherein the one or more alphabet-partition types are used for one or more layers of scalability for signal-to-noise ratio-scalable decoding based on correlations between the transform coefficients.

10. An apparatus for point cloud coefficient decoding, the apparatus comprising:
at least one memory configured to store computer program code; and
at least one processor configured to access the at least one memory and operate according to the computer program code, the computer program code comprising:
partitioning code configured to cause the at least one processor to partition transform coefficients associated with compressed point cloud data into one or more sets;
first determining code code configured to cause the at least one processor to determine set-index values of the partitioned transform coefficients, wherein the determining comprises determining the set-index values from an aggregated super-symbol;
second determining code configured to cause the at least one processor to determine symbol-index values of the partitioned transform coefficients; and
decompressing code configured to cause the at least one processor to generate decompressed point cloud data based on the set-index values and the symbol-index values.

11. The apparatus of claim 10, wherein the partitioning of the transform coefficients comprises decomposing the transform coefficients associated with the compressed point cloud data to determine the set-index values and the symbol-index values, the symbol index-values specifying locations of the transform coefficients within a set.

12. The apparatus of claim 10, wherein generating the aggregated super-symbol comprises:
determining a maximum set-index value from the set-index values associated with children of a same patent node in an octree associated with point cloud data;
entropy-coding the maximum set-index value based on the maximum set-index value being not zero; and
aggregating a plurality of the set-index values together to entropy-code one or more groups of set-index values based on the maximum set-index value being small.

13. The apparatus of claim 10, wherein generating the aggregated super-symbol comprises:
determining a maximum set-index value from the set-index values associated with children of a same patent node in an octree associated with point cloud data;
entropy-coding the maximum set-index value based on the maximum set-index value being not zero;
entropy-coding an alpha value with a 255-symbol alphabet; and
aggregating a plurality of the set-index values together to entropy-code one or more groups of set-index values based on a sibling occupancy value index of the octree being smaller than the maximum set-index value.

14. The apparatus of claim 10, wherein frequency values associated with the transform coefficients are stored in a cache or frequency-sorting based lookup table in a descending order, wherein a lowest set-index value is assigned to a transform coefficient having a greatest frequency value.

15. The apparatus of claim 10, wherein the symbol-index values and the set-index values are signaled to indicate an alphabet-partition having associated boundary values based on one or more alphabet-partition types shared between an encoder and a decoder.

16. A non-transitory computer-readable storage medium storing instructions configured to cause at least one processor to:
partition transform coefficients associated with compressed point cloud data into one or more sets;
determine set-index values of the partitioned transform coefficients, wherein the determining comprises determining the set-index values based on an aggregated super-symbol;
determining symbol-index values of the partitioned transform coefficients; and
generating decompressed point cloud data based on the set-index values and the symbol-index values.

17. The computer-readable medium of claim 16, wherein the partitioning of the transform coefficients comprises decomposing the transform coefficients associated with the compressed point cloud data to determine the set-index values and the symbol-index values, the symbol index-values specifying locations of the transform coefficients within a set.

18. The computer-readable medium of claim 16, wherein generating the aggregated super-symbol comprises:
determining a maximum set-index value from the set-index values associated with children of a same patent node in an octree associated with point cloud data;
entropy-coding the maximum set-index value based on the maximum set-index value being not zero; and
aggregating a plurality of the set-index values together to entropy-code one or more groups of set-index values based on the maximum set-index value being small.

19. The computer-readable medium of claim 16, wherein generating the aggregated super-symbol comprises:
determining a maximum set-index value from the set-index values associated with children of a same patent node in an octree associated with point cloud data;
entropy-coding the maximum set-index value based on the maximum set-index value being not zero;
entropy-coding an alpha value with a 255-symbol alphabet; and
aggregating a plurality of the set-index values together to entropy-code one or more groups of set-index values based on a sibling occupancy value index of the octree being smaller than the maximum set-index value.

20. The computer-readable medium of claim 16, wherein the symbol-index values and the set-index values are signaled to indicate an alphabet-partition having associated boundary values based on one or more alphabet-partition types shared between an encoder and a decoder.

* * * * *